(12) United States Patent
Liaghati (10) Patent No.: US 12,086,434 B2
(45) Date of Patent: Sep. 10, 2024

(54) PRIORITIZED STORAGE AND TRANSMISSION TOOL FOR OPTIMIZED TELEMETRY UNIT MEMORY ALLOCATION

(71) Applicant: The Boeing Company, Chicago, IL (US)

(72) Inventor: Amir Leon Liaghati, Irvine, CA (US)

(73) Assignee: The Boeing Company, Chicago, IL (US)

( * ) Notice: Subject to any disclaimer, the term of this patent is extended or adjusted under 35 U.S.C. 154(b) by 58 days.

(21) Appl. No.: 17/805,315

(22) Filed: Jun. 3, 2022

(65) Prior Publication Data
US 2023/0393768 A1 Dec. 7, 2023

(51) Int. Cl.
*G06F 3/06* (2006.01)

(52) U.S. Cl.
CPC .......... *G06F 3/0631* (2013.01); *G06F 3/0604* (2013.01); *G06F 3/0656* (2013.01); *G06F 3/0679* (2013.01)

(58) Field of Classification Search
None
See application file for complete search history.

(56) References Cited

U.S. PATENT DOCUMENTS

| 11,258,716 | B1 * | 2/2022 | Coglitore | H04L 47/2425 |
| 2020/0410787 | A1 * | 12/2020 | Petousis | G07C 5/008 |
| 2021/0390848 | A1 * | 12/2021 | Ogawa | G08G 1/0112 |

FOREIGN PATENT DOCUMENTS

EP   3242513 A1   11/2017

OTHER PUBLICATIONS

Extended European Search Report, Application No. 23166021.8, Dated Jul. 26, 2023, 10 Pages.

* cited by examiner

*Primary Examiner* — Tracy C Chan
(74) *Attorney, Agent, or Firm* — Jordan IP Law, LLC (57) ABSTRACT

Systems, apparatuses and methods provides for technology that identifies transmission priorities for a plurality of streamed data sources. The transmission priorities indicate a transmission order associated with the plurality of streamed data sources. The technology further generates a first permutation that is a first assignment of the plurality of streamed data sources to a plurality of transmitters for transmission, generates a first prediction of whether data from the plurality of streamed data sources will need to be stored prior to transmission based on the first permutation, the transmission priorities and bandwidths of the plurality of transmitters. The technology further generates a first allocation of storage space sizes that the plurality of streamed data sources will need based on the first permutation and the first prediction.

20 Claims, 8 Drawing Sheets

PRIORITIZED STORAGE AND TRANSMISSION TOOL FOR OPTIMIZED TELEMETRY UNIT MEMORY ALLOCATION

STATEMENT REGARDING FEDERALLY SPONSORED RESEARCH OR DEVELOPMENT

The invention described herein was made in the performance of work under NASA Contract No. NNM07AB03C and is subject to the provisions of Section 305 of the National Aeronautics and Space Act of 1958 (72 Stat. 435; 42 U.S.C. 2457).

FIELD

Examples generally relate to a prioritized storage and transmission (PST) tool that generates an enhanced memory allocation for storage buffers of telemetry units. The PST tool generates a granular storage model based on the priority of data to be transmitted and/or stored to determine how each storage buffer is changed during the mission and allocate sizes of the storage buffers accordingly.

BACKGROUND

A vehicle, (e.g., an airplane, spacecraft, helicopter, watercraft, ground vehicle, etc.), generates data while in operation. The data can pertain to various aspects of the vehicle and can be transmitted with a telemetry unit. The telemetry unit has a finite storage space to store the data. Further, the storage of the telemetry unit is a single storage buffer for all the data types (e.g., one large shared buffer), but instead is several buffers each dedicated to a different data source (e.g., sensor) and data type.

SUMMARY

In accordance with one or more examples, provided is at least one computer readable storage medium that comprises a set of executable program instructions. The set of executable program instructions which when executed by a computing system, cause the computing system to identify transmission priorities for a plurality of streamed data sources, where the transmission priorities indicate a transmission order associated with the plurality of streamed data sources, generate a first permutation that is a first assignment of the plurality of streamed data sources to a plurality of transmitters for transmission, generate a first prediction of whether data from the plurality of streamed data sources will need to be stored prior to transmission based on the first permutation, the transmission priorities and bandwidths of the plurality of transmitters, and generate a first allocation of storage space sizes that the plurality of streamed data sources will need based on the first permutation and the first prediction.

In accordance with one or more examples, provided is a system comprising a processor, and a memory having a set of instructions. The set of instructions which when executed by the processor, cause the system to identify transmission priorities for a plurality of streamed data sources, where the transmission priorities indicate a transmission order associated with the plurality of streamed data sources, generate a first permutation that is a first assignment of the plurality of streamed data sources to a plurality of transmitters for transmission, generate a first prediction of whether data from the plurality of streamed data sources will need to be stored prior to transmission based on first permutation, the transmission priorities and bandwidths of the plurality of transmitters, and generate a first allocation of storage space sizes that the plurality of streamed data sources will need based on the first permutation and the first prediction.

In accordance with one or more examples, provided is a method comprising identifying transmission priorities for a plurality of streamed data sources, where the transmission priorities indicate a transmission order associated with the plurality of streamed data sources. The method further includes generating a first permutation that is a first assignment of the plurality of streamed data sources to a plurality of transmitters for transmission, generating a first prediction of whether data from the plurality of streamed data sources will need to be stored prior to transmission based on the first permutation, the transmission priorities and bandwidths of the plurality of transmitters, and generating a first allocation of storage space sizes that the plurality of streamed data sources will need based on the first permutation and the first prediction.

The features, functions, and advantages that have been discussed can be achieved independently in various examples or can be combined in yet other examples further details of which can be seen with reference to the following description and drawings.

BRIEF DESCRIPTION OF THE DRAWINGS

The various advantages of the examples will become apparent to one skilled in the art by reading the following specification and appended claims, and by referencing the following drawings, in which:

DESCRIPTION

Figure 1A:
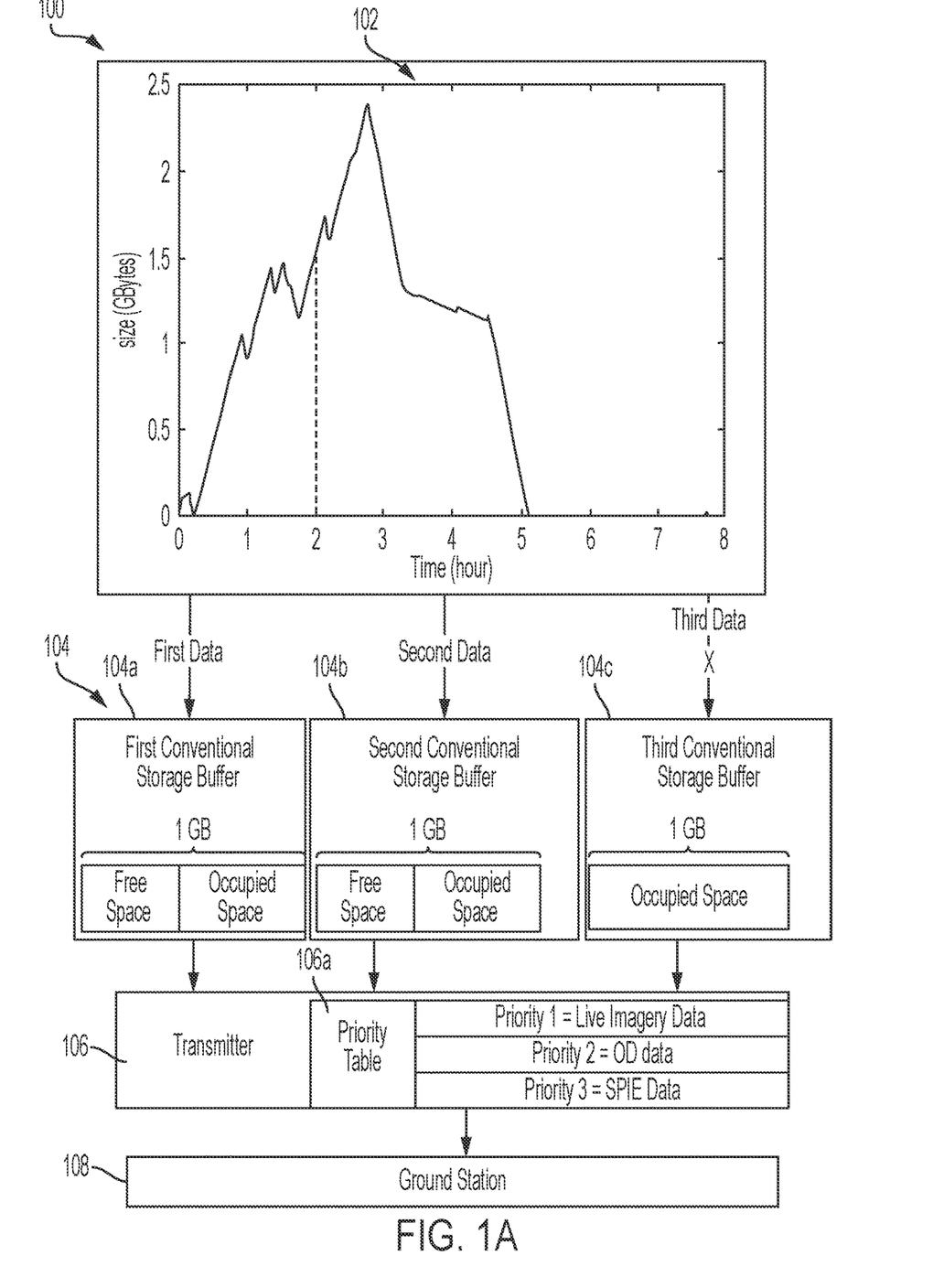
FIGS. 1A and 1B are illustrations of an example of a conventional storage buffer allocation process and an enhanced storage buffer allocation process.

Turning now to FIG. 1A, a conventional storage buffer allocation process 100 and an enhanced storage buffer allocation process 120 are illustrated. In the conventional storage buffer allocation process 100, storage is only analyzed from an overall perspective rather than on a buffer-by-buffer basis leading to inefficiency, lost data and poor memory allocations. The enhanced storage buffer allocation process 120 is executed with a PST tool (e.g., a computing system, computing device, non-transitory computer readable storage medium, etc.). As will be explained in further detail below, the enhanced storage buffer allocation process 120 provides a granular analysis of storage capacity that will be required by various data sources. For example, some vehicles (e.g., an aircraft, a ground vehicle, watercraft, spacecraft such as a satellite, space telescope, or space vehicle, etc.) transmit information to a base station during transit. The information can be stored on-board the vehicle prior to transmission for various reasons (e.g., bandwidth limitations). Examples as related to the enhanced storage buffer allocation process 120 determine an individual amount of storage space that each data source (e.g., sensor(s)) will need for buffering information during transit. For example, the enhanced storage buffer allocation process 120 may include simulating the data sources to predict amounts of data storage that each of the data sources will individually utilize. A storage space is divided into buffers based on the predicted amounts so that each respective data source has an adequate amount of data storage associated with the respective data source. That is, granular buffer storage amounts are set in order to avoid situations in which the data sources generate an amount of data that exceeds buffer storage limits. Doing so reduces data loss during transit and efficiently allocates resources to reduce data storage overhead.

Examples as related to the enhanced storage buffer allocation process 120 include a live data failure detection where the PTS tool detects where live data is predicted to not be fully transmitted. Doing so enables the PST tool and/or a user to identify such cases, and further allows an automated selection of data storage characteristics to prevent and/or reduce data omission. Thus, even though some live data (e.g., live imagery) never buffers (e.g., no allocation of any buffer memory to live imagery because the live imagery data is always transmitted live or immediately), the PST tool still considers the live data as part of the below modelling process. If the PST tool shows that live data is being dropped in the model, then the PST tool detects that a current (or projected) data rate for the mission fails and the data rate must be changed so the live data will not be dropped.

Turning now to conventional storage buffer allocation process 100, a conventional data storage graph 102 is illustrated. The conventional data storage graph 102 shows an overall data storage pattern throughout transit of a vehicle (e.g., aircraft, a ground vehicle, watercraft, a spacecraft such as an artificial satellite, space telescope, or space vehicle, etc.). The conventional data storage graph 102 can be a projected amount of data (e.g., an estimation, simulation, etc.) that will be generated. Data that cannot be transmitted, will be stored in the conventional buffers 104 unless the conventional buffers 104 are at full capacity. In such an event, data is dropped as the data cannot be stored or transmitted, and is therefore discarded.

In conventional storage buffer allocation process 100, there are three different types of data. Specifically, there is first data, second data, and third data. Each of the three different types of data originates with a different data source (e.g., sensor, computing device, etc.). For example, a camera can generate the second data (e.g., live imagery data), while a global positioning satellite system can generate the first data.

Based on the conventional data storage graph 102, the conventional storage buffer allocation process 100 allocates 1 GB of storage to each of the first data, the second data, and the third data. Each of the first, second, and third conventional storage buffers 104a, 104b, 104c has allocated one gigabyte of storage space. The first, second, and third conventional storage buffers 104a, 104b, 104c can be part of a same storage. Thus, the space of the same storage is equally distributed among the first, second, and third conventional storage buffers 104a, 104b, 104c.

A transmitter 106 transmits data from the conventional buffers 104 to a ground station 108. The transmitter 106 transmits the data during transit (e.g., a flight, mission, etc.) of the vehicle, and completes transmission of all data prior to the transit ending. Any data that cannot be immediately transmitted is stored in the conventional buffers 104 until the transmitter 106 is available. When the transmitter 106 is available, the data is transmitted and deleted from storage in the conventional buffers 104. Data that is not transmitted is stored in the conventional buffers 104.

The transmitter 106 transmits data according to the priority table 106a. First data has a priority of one meaning that the first data is transmitted first. The second data has a priority of two, meaning that second data is transmitted second and after all of the first data has been transmitted, or in some cases concurrently therewith if sufficient bandwidth exists for concurrent transmission. Sufficient bandwidth exists when the second data and third data have a combined transmission amount that is equal to or below the maximum available bandwidth of the transmitter 106. The third data has a priority of three, meaning that the third data is transmitted last and after the first data and second data have been transmitted (or in some cases concurrently therewith if sufficient bandwidth exists). Thus, data is transmitted based on priorities assigned to the data and/or the data sources that generate the data.

At around two seconds as indicated on the conventional data storage graph 102, the third data is unable to be stored in the third conventional storage buffer 104c. In detail, the third conventional storage buffer 104c is fully occupied as illustrated by the "occupied space." That is, the bandwidth of the transmitter 106 is consumed by transmitting the first data and/or the second data. As such, the transmitter 106 does not have available bandwidth to transmit the third data to alleviate congestion in the third conventional storage buffer 104c. Thus, the third data accumulates in the third conventional storage buffer 104c until the third conventional storage buffer 104c is fully occupied. When the third conventional storage buffer 104c is fully occupied, incoming third data can no longer be stored in the third conventional storage buffer 104c unless other third data is removed from the third conventional storage buffer 104c.

Thus, the conventional storage buffer allocation process 100 fails to transmit all data since some of the third data is not stored in the third conventional storage buffer 104c. As such, the conventional storage buffer allocation process 100 results in incomplete data transmissions. Furthermore, the conventional storage buffer allocation process 100 allocates excess storage space to both the first conventional storage buffer 104a and the second conventional storage buffer 104b as illustrated by the free spaces. In contrast, the third conventional storage buffer 104c is not allocated sufficient space and therefore cannot store all data. That is, the conventional storage buffer allocation process 100 does not allocate storage in a real-life and usage based manner. As a consequence, the conventional storage buffer allocation process 100 fails to transmit all data.

That is, the conventional data storage graph 102 is based on all the data (the sum of all data types including the first data, second data, and third data) for a permutation (e.g., an arrangement of data sources to a particular transmitter that will transmit data from the data sources). For example, the conventional storage buffer allocation process 100 assigns the first data, second data, and third data to the transmitter 106 as one permutation. Other unillustrated permutations exists with other unillustrated transmitters and data sources (e.g., the first data is assigned to a different transmitter). The conventional data storage graph 102 implies that there is only one value for storage at a given time. Such a generalized analysis fails to identify the granular storage spaces that are required by the data sources. For example, the utilized storage will increase if the bandwidth of the transmitter 106 is insufficient to transmit some stored data and it will decrease if the transmitter 106 has enough data to transmit real time and storage data.

Turning now to the enhanced storage buffer allocation process 120, an efficient storage allocation is illustrated. In the enhanced storage buffer allocation process 120 each of the first data, the second data, and the third data is shown at a granular level with respect to time and storage size in enhanced data storage graph 128. Each of the first data, the second data, and the third data originates with a different data source (e.g., sensor) similar to the above. The enhanced data storage graph 128 can be a simulation (e.g., prediction) of data storage, and is based on the bandwidth of the transmitter 124, the priorities of the different data types (e.g., first data, second data, and third data) as well as a projected amount of each data type.

Figure 1B:
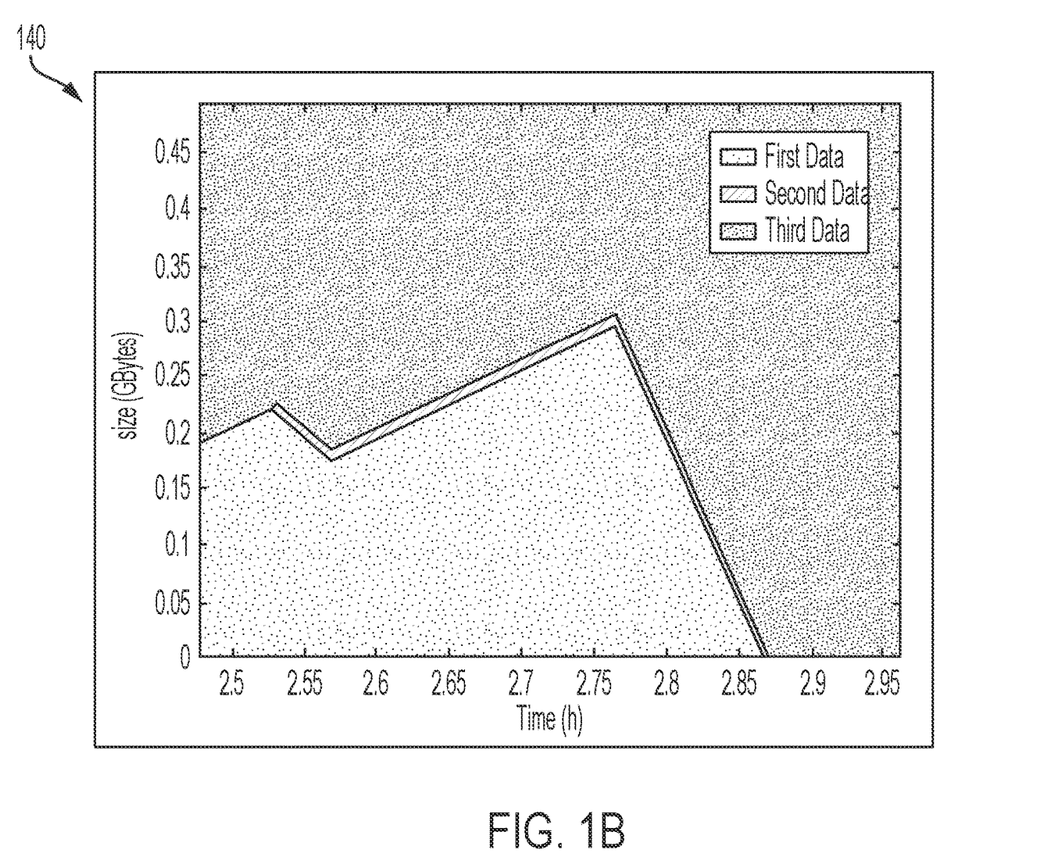

The exact amount of data storage of each data type with respect to time is shown in the enhanced data storage graph 128. For example, at time equals two seconds it can be understood that that over 1 GB of storage space is needed by the third data. Further, at around 2.7 seconds, it can be understood that around 2 gigabytes of storage space is needed for the third data. In contrast, less than 0.5 gigabytes is ever needed for the first data, and less than 0.1 gigabytes of data is ever needed for the second data. The second data is shown in more detail at area 140, which shows a greater detail in FIG. 1B. In FIG. 1B it can be seen that the second requires less than 0.1 gigabytes of storage space.

The enhanced data storage graph 128 is generated based on the priorities of the data, the bandwidth of the transmitter 124, and a predicted amount of data that will be generated during transit. That is, the enhanced storage buffer allocation process 120 predicts how much of the first data, the second data and the third data will be generated during transit, and how effectively the transmitter 124 can transmit the generated data to determine how much data will not be immediately transmitted and thus will be stored.

In some examples of the enhanced storage buffer allocation process 120, the PST data includes live data failure detection. In detail, the second data is live data which should not be stored and should always be immediately transmitted. In such a case, the transmitter 124 can simultaneously transmit the first and second data. If the second data is illustrated in the enhanced data storage graph 128, the PST tool can determine that the current bandwidth allocations of the transmitter 124 are ineffective to meet the requirement that the live data is immediately transmitted, and modify parameters. For example, the parameters can include bandwidth allocations of the transmitter 124 and/or storage allocations of the enhanced storage buffers 122. After the modification, the PST tool can generate the enhanced data storage graph 128 based on the modified parameters and determine if the modified parameters result in meeting the requirement that the live data is immediately transferred.

The transmitter 124 transmits data to the ground station 126 based on the priority table 124a. In the enhanced storage buffer allocation process 120, second data (which is associated with a first data source) has a priority of one and is transmitted first, first data (which is associated with a second data source) has a priority of two and is transmitted second, and third data has a priority of three and is transmitted third.

Allocations of data storage space (e.g., storage space sizes) are determined based on the enhanced data storage graph 128. The first enhanced storage buffer 122a will store the first data, the second enhanced storage buffer 122b will store the second data, and the third enhanced storage buffer 122c will store the third data. Therefore, the first enhanced storage buffer 122a has a total storage capacity of 0.5 gigabytes, the second enhanced storage buffer 122B has a total storage capacity of 0.1 gigabytes while the third enhanced storage buffer 122C has a storage capacity of 2.5 gigabytes. Therefore, even at time equals 2 seconds, the third data will be able to be stored in the third enhanced storage buffer 122c. In the conventional storage buffer allocation process 100, third data cannot be stored in the third conventional storage buffer 104c at time equals 2 seconds. Indeed, throughout the entirety of the enhanced data storage graph 128, the third enhanced storage buffer 122c is able to sufficiently store the third data to avoid dropping of any data.

Furthermore, the total storage required by the first enhanced storage buffer 122a, the second enhanced storage buffer 122b, and the third enhanced storage buffer 122c is less than the total space required by the first conventional storage buffer 104a, second conventional storage buffer 104b, and the third conventional storage buffer 104c. Thus, the enhanced storage buffer allocation process 120 not only allocates resources effectively to reduce dropping of information, but utilizes less resources in order to do so. As such, the enhanced storage buffer allocation process 120 as described herein enhances computer efficiency and resource utilization to effectively transmit data while in transit.

In some examples of the enhanced storage buffer allocation process 120, the maximum storage values of the first data, the second data, and the third data from the enhanced data storage graph 128 are used to feed classifiers and select permutations based on the max values and other parameters. Thus, the enhanced storage buffer allocation process 120 can include different combinations of data with different transmitters. In some examples of the enhanced storage buffer allocation process 120, enhanced storage buffers 122 and transmitter 124 form a telemetry unit. The enhanced storage buffer allocation process 120 allows user to optimized buffer allocations for each type of data based on each permutations which could be uniform or non-uniform distribution based on hardware and design capability.

Figure 2:
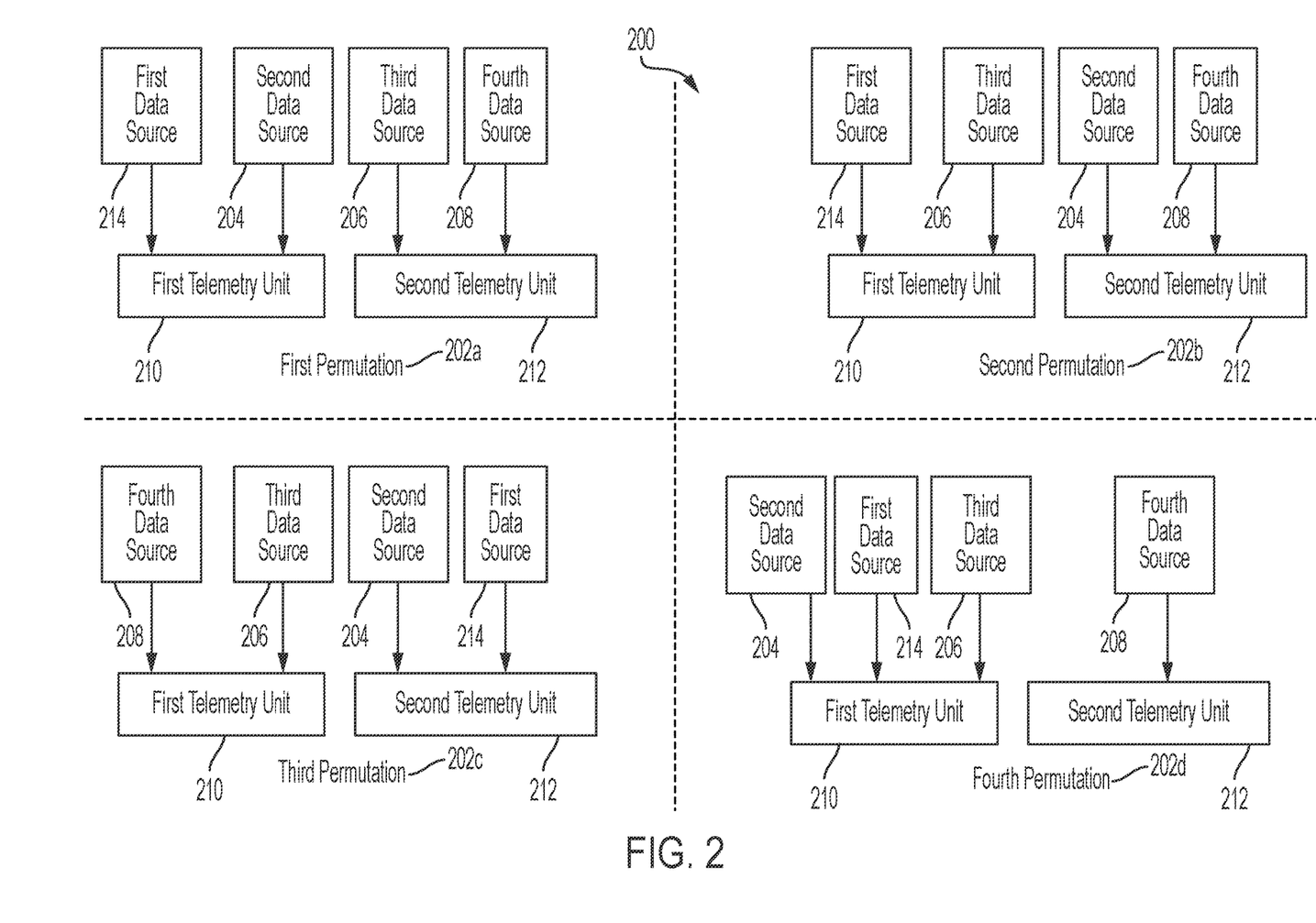
FIG. 2 is an illustration of various permutations of data sources to transmitters.

FIG. 2 illustrates various permutations 200. A vehicle includes first, second, third, and fourth data sources 214, 204, 206, 208, first telemetry unit 210 and second telemetry unit 212. A first permutation 202a allocates first data source 214 and second data source 204 to a first telemetry unit 210 (which includes buffers and a transmitter), and a third data source 206 and a fourth data source 208 to a second telemetry unit 212 (which includes buffers and a transmitter). A second permutation 202b allocates first data source 202 and third data source 206 to the first telemetry unit 210, and a second data source 204 and a fourth data source 208 to the second telemetry unit 212. A third permutation 202c allocates fourth data source 208 and third data source 206 to the first telemetry unit 210, and the second data source 204 and the first data source 214 to the second telemetry unit 212. A fourth permutation 202d allocates second data source 204, first data source 214, and third data source 206 to the first telemetry unit 210, and the fourth data source 208 to the second telemetry unit 212.

Each respective permutation of the first through the fourth permutations (hereinafter "first-fourth") 202a-202d can be analyzed according to the enhanced storage buffer allocation process 120 to determine if the respective permutation meets certain metrics. The metrics include whether all data will be transmitted prior to a transit (e.g., mission) of the vehicle completing. If not, the respective permutation is abandoned and will not be utilized. If the data will complete transmission prior to the transit ending, the respective transmission is analyzed further to determine how much storage space will be utilized by the respective permutation. A permutation with the least amount of storage space and that will complete prior to transit completion is selected as the final permutation, and storage spaces sizes are allocated to match the storage spaces sizes of the permutation as determined by the enhanced storage buffer allocation process 120.

In some examples, permutations which result in an amount of data of the plurality of streamed data sources being greater than a maximum available size of buffers associated with the first or second telemetry units 210, 212 are discarded. For example, suppose that the fourth permutation 202*d* results in one or more of the first, second, and third data sources 214, 204, 206 having a storage size that is greater than a maximum available size of a buffer of the first telemetry unit 210. The fourth permutation 202*d* can be discarded. In contrast, permutations of the first-fourth 202*a*-202*d* are maintained when an amount of data of the plurality of streamed data sources is less than an available size of buffers associated with the first and second telemetry units 210, 212.

Figure 3:
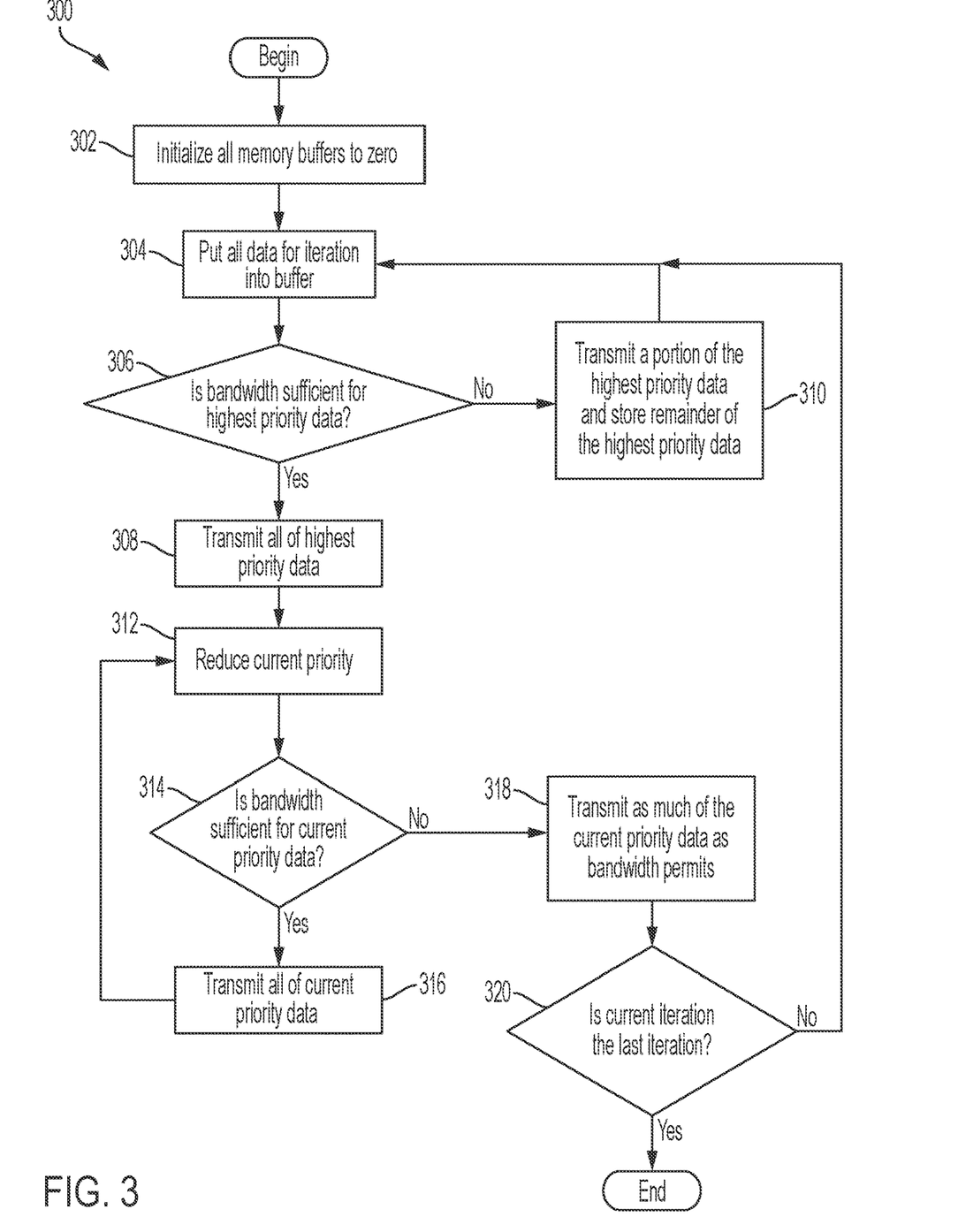
FIG. 3 is an illustration of a method of storing and transmitting data.

FIG. 3 shows a method 300 of storing and transmitting data. The method 300 is generally implemented by any of the examples described herein, for example, the enhanced storage buffer allocation process 120 (FIG. 1A) and/or various permutations 200 (FIG. 2) can be executed in conjunction with method 400.

In an example, the method 300 is implemented at least partly in one or more modules as a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 302 initializes all memory buffers to zero. Illustrated processing block 304 puts all data for an iteration (which corresponds to a slice of time during transit) into a buffer. Illustrated processing block 306 determines if a bandwidth is sufficient for highest priority data. The bandwidth corresponds to a transmitter that will transmit the data. If not, illustrated processing block 310 transmits a portion of the highest priority data and stores a remainder of the highest priority data in, for example, a corresponding buffer. If the bandwidth is sufficient for the highest priority data, illustrated processing block 308 transmit all of highest priority data. Illustrated processing block 312 reduces the current priority (e.g., decrements the priority by one). Illustrated processing block 314 determines if the bandwidth is sufficient for current priority data. If not, illustrated processing block 318 transmits as much of the current priority data as the bandwidth permits. Illustrated processing block 320 then determines if the current iteration is the last iteration. If not, illustrated processing block 304 executes again. Otherwise, the method 300 ends. If processing block 314 determines that the bandwidth is sufficient for the current priority data, illustrated processing block 316 transmits all of the current priority data (in addition to the highest priority data), and illustrated processing block 312 executes again to reduce the current priority and analyze whether further lower priority data can be transmitted in the following processing blocks.

Figure 4:
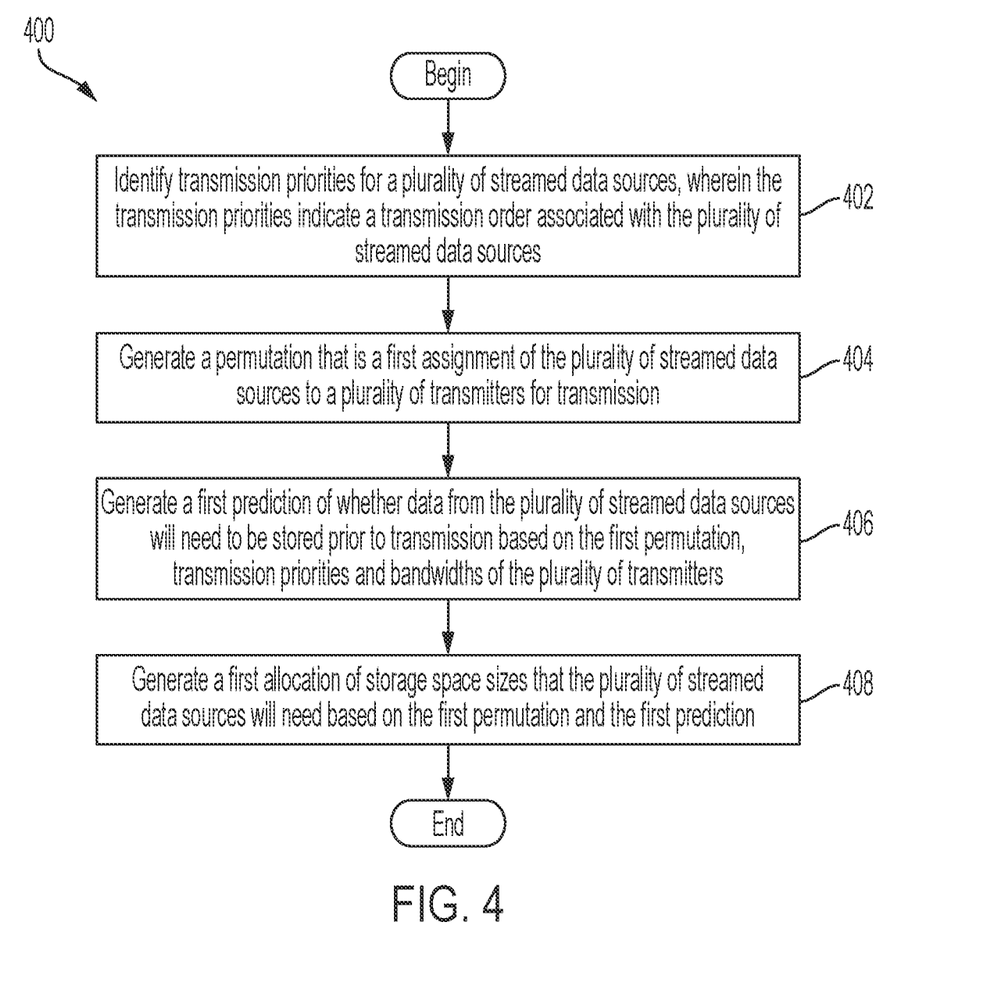
FIG. 4 is an illustration of a method of generating allocations.

FIG. 4 shows a method 400 of generating allocations. The method 400 is generally implemented by any of the examples described herein, for example, the enhanced storage buffer allocation process 120 (FIG. 1A), various permutations 200 (FIG. 2) and/or method 300 (FIG. 3).

Illustrated processing block 402 identifies transmission priorities for a plurality of streamed data sources, where the transmission priorities indicate a transmission order associated with the plurality of streamed data sources. Illustrated processing block 404 generates a first permutation that is a first assignment of the plurality of streamed data sources to a plurality of transmitters for transmission. Illustrated processing block 406 generates a first prediction of whether data from the plurality of streamed data sources will need to be stored prior to transmission based on the first permutation, the transmission priorities and bandwidths of the plurality of transmitters. Illustrated processing block 408 generates a first allocation of storage space sizes that the plurality of streamed data sources will need based on the first permutation and the first prediction.

In a first example of the method 400, the plurality of streamed data sources is associated with a vehicle, and the method 400 further includes determining whether to maintain or discard the first allocation of the storage space sizes based on whether data generated by the plurality of streamed data sources will be transmitted prior to a completion of an operation by the vehicle. In a second example, the method 400 assigns first and second streamed data sources from the plurality of streamed data sources to a first transmitter from the plurality of transmitters. The second example can be combined with a third example in which the method 400 determines a first amount of data that the first streamed data source will generate, determines a second amount of data that second streamed data source will generate, and determines the first allocation of the storage space sizes based on the first and second amounts. In a fourth example that can be combined with the second and third examples, the method 400 determines that the first streamed data source is associated with a first transmission priority from the transmission priorities, determines that the second streamed data source is associated with a second transmission priority from the transmission priorities and determines based on the first and second transmission priorities, that the first streamed data source is to have data transmitted by the first transmitter before data from the second streamed data source is transmitted by the first transmitter and determines the first allocation of the storage space sizes based on the first streamed data source having data transmitted by the first transmitter before data from the second streamed data source is transmitted by the first transmitter.

In a fifth example that is combinable with any of the examples of the method 400, the method 400 generates a second permutation that is a second assignment of the plurality of streamed data sources to the plurality of transmitters for transmission, generates a second prediction of whether data from the plurality of streamed data sources will need to be stored prior to transmission based on the second permutation, the transmission priorities and the bandwidths of the plurality of transmitters, generates a second allocation of storage space sizes that the plurality of streamed data sources will need based on the second permutation and the second prediction and determines whether to retain the first permutation or the second permutation based on the first and second allocations. In a sixth example that is combinable with any of the examples of the method 400, the method 400 determines whether to maintain or discard the first permutation based on whether an amount of data of the plurality of streamed data sources is less than an available size of buffers associated with the plurality of transmitters.

Figure 5:
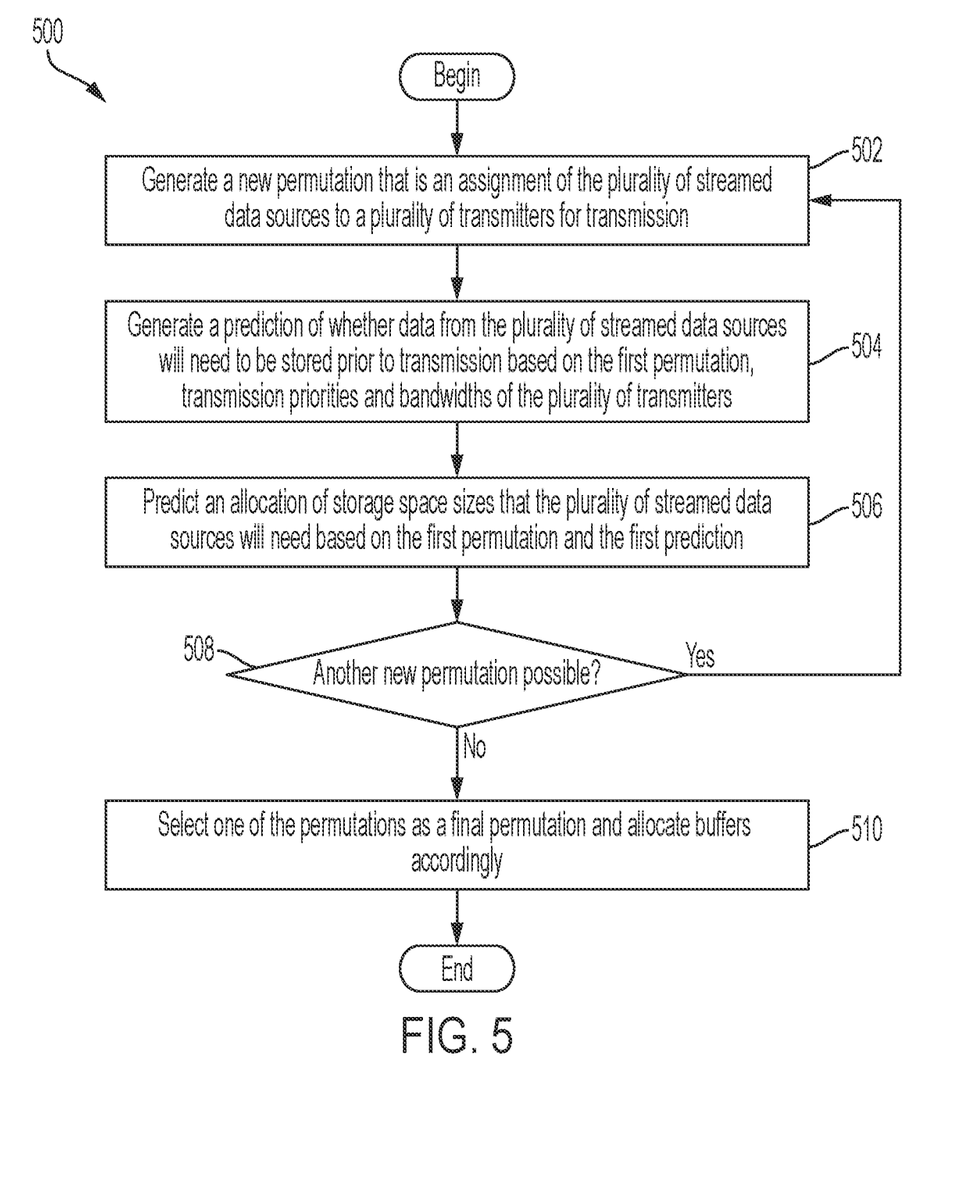
FIG. 5 is an illustration of a method of generating permutations.

FIG. 5 shows a method 500 of generating permutations. The method 500 is generally implemented by any of the examples described herein. The method 500 is generally implemented by any of the examples described herein, for example, the enhanced storage buffer allocation process 120 (FIG. 1A), various permutations 200 (FIG. 2), method 300 (FIG. 3) and/or method 400 (FIG. 4).

Illustrated processing block 502 generates a new permutation that is an assignment of the plurality of streamed data sources to a plurality of transmitters for transmission. Illustrated processing block 504 generates a prediction of whether data from the plurality of streamed data sources will need to be stored prior to transmission based on the first permutation, transmission priorities and bandwidths of the plurality of transmitters. Illustrated processing block 506 predicts an allocation of storage space sizes that the plurality of streamed data sources will need based on the first permutation and the first prediction. Illustrated processing block 508 determines if another new permutation is possible. If so, illustrated processing block 502 executes again. Otherwise, illustrated processing block 510 selects one of the permutations as a final permutation, for example based on the enhanced storage buffer allocation process 120, and allocates buffers accordingly. For example, processing block 510 selects the most efficient permutation (e.g., utilizes the least amount of memory and completes prior to a completion of transit).

Figure 6:
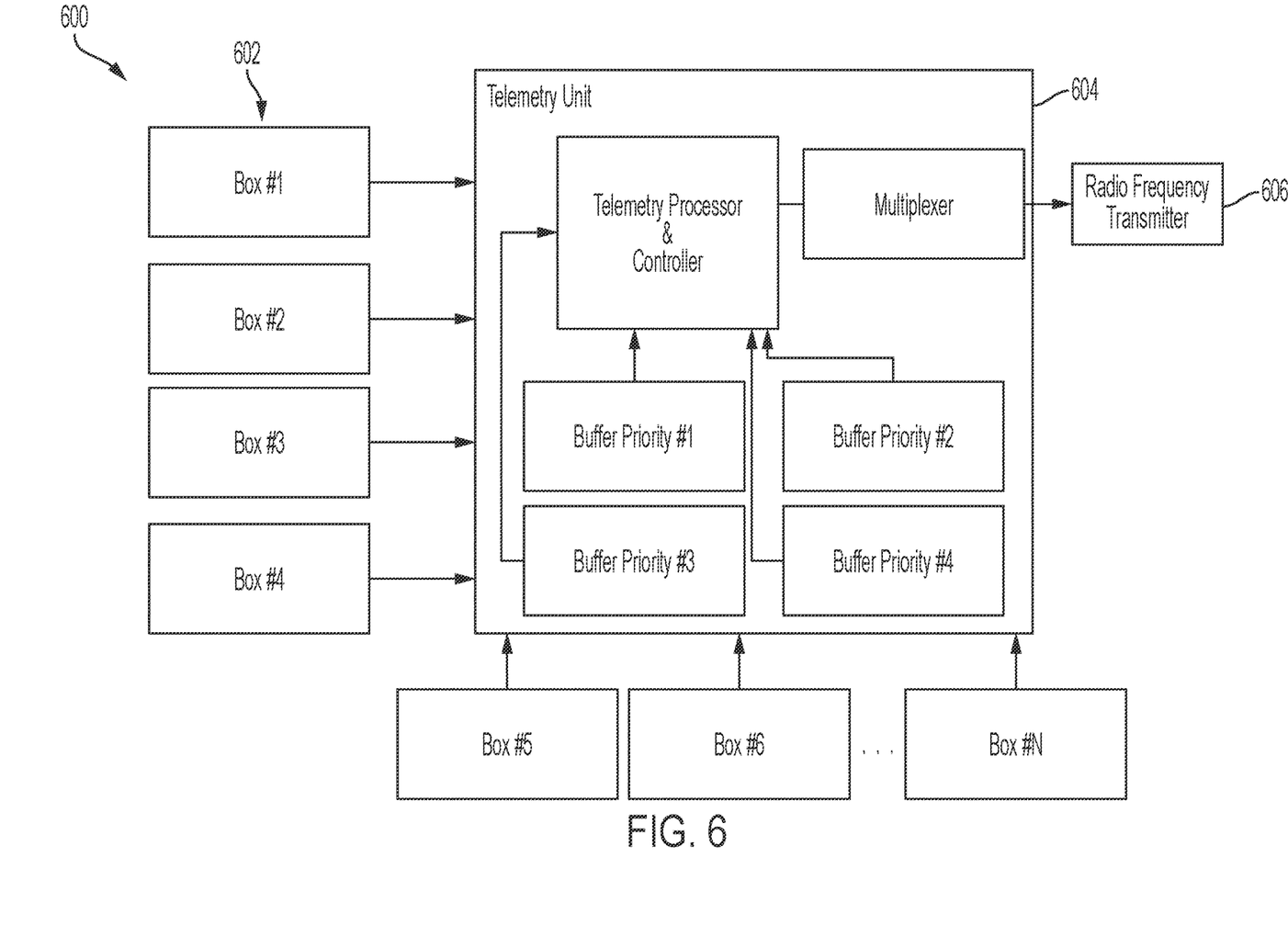
FIG. 6 is an illustration of an example of a telemetry architecture.

FIG. 6 illustrates a telemetry architecture 600. A plurality of data sources 602 are coupled with telemetry unit 604. The telemetry unit 604 includes a telemetry processor and controller, buffers assigned to different priorities and a multiplexer. The telemetry unit transmits data through the radio frequency transmitter 606 to a ground station.

Further, the disclosure comprises additional examples as detailed in the following clauses below.

Clause 1. At least one computer readable storage medium comprising a set of executable program instructions, which when executed by a computing system, cause the computing system to:
identify transmission priorities for a plurality of streamed data sources, wherein the transmission priorities indicate a transmission order associated with the plurality of streamed data sources;
generate a first permutation that is a first assignment of the plurality of streamed data sources to a plurality of transmitters for transmission;
generate a first prediction of whether data from the plurality of streamed data sources will need to be stored prior to transmission based on the first permutation, the transmission priorities and bandwidths of the plurality of transmitters; and generate a first allocation of storage space sizes that the plurality of streamed data sources will need based on the first permutation and the first prediction.

Clause 2. The at least one computer readable storage medium of clause 1, wherein the plurality of streamed data sources are associated with a vehicle, and further wherein the instructions, when executed, cause the computing system to:
determine whether to maintain or discard the first allocation of the storage space sizes based on whether data generated by the plurality of streamed data sources will be transmitted prior to a completion of an operation by the vehicle.

Clause 3. The at least one computer readable storage medium of clause 1, wherein the instructions, when executed, cause the computing system to:
assign first and second streamed data sources from the plurality of streamed data sources to a first transmitter from the plurality of transmitters.

Clause 4. The at least one computer readable storage medium of clause 3, wherein the instructions, when executed, cause the computing system to:
determine a first amount of data that the first streamed data source will generate;
determine a second amount of data that the second streamed data source will generate; and
determine the first allocation of the storage space sizes based on the first and second amounts.

Clause 5. The at least one computer readable storage medium of clauses 3 or 4, wherein the instructions, when executed, cause the computing system to:
determine that the first streamed data source is associated with a first transmission priority from the transmission priorities;
determine that the second streamed data source is associated with a second transmission priority from the transmission priorities;
determine based on the first and second transmission priorities, that the first streamed data source is to have data transmitted by the first transmitter before data from the second streamed data source is transmitted by the first transmitter; and
determine the first allocation of the storage space sizes based on the first streamed data source having data transmitted by the first transmitter before data from the second streamed data source is transmitted by the first transmitter.

Clause 6. The at least one computer readable storage medium of any of clauses 1-5, wherein the instructions, when executed, cause the computing system to:
generate a second permutation that is a second assignment of the plurality of streamed data sources to the plurality of transmitters for transmission;
generate a second prediction of whether data from the plurality of streamed data sources will need to be stored prior to transmission based on the second permutation, the transmission priorities and the bandwidths of the plurality of transmitters;
generate a second allocation of storage space sizes that the plurality of streamed data sources will need based on the second permutation and the second prediction; and
determine whether to retain the first permutation or the second permutation based on the first and second allocations.

Clause 7. The at least one computer readable storage medium of any of clauses 1-6, wherein the instructions, when executed, cause the computing system to:
determine whether to maintain or discard the first permutation based on whether an amount of data of the plurality of streamed data sources is less than an available size of buffers associated with the plurality of transmitters.

Clause 8. A system comprising:
a processor; and
a memory having a set of instructions, which when executed by the processor, cause the system to:
identify transmission priorities for a plurality of streamed data sources, wherein the transmission priorities indicate a transmission order associated with the plurality of streamed data sources;
generate a first permutation that is a first assignment of the plurality of streamed data sources to a plurality of transmitters for transmission;

generate a first prediction of whether data from the plurality of streamed data sources will need to be stored prior to transmission based on first permutation, the transmission priorities and bandwidths of the plurality of transmitters; and generate a first allocation of storage space sizes that the plurality of streamed data sources will need based on the first permutation and the first prediction.

Clause 9. The system of clause 8, wherein the plurality of streamed data sources are associated with a vehicle, further wherein the set of instructions of the memory, when executed, cause the system to:

determine whether to maintain or discard the first allocation of the storage space sizes based on whether data generated by the plurality of streamed data sources will be transmitted prior to a completion of an operation by the vehicle.

Clause 10. The system of clause 8, wherein the set of instructions of the memory, when executed, cause the system to:

assign first and second streamed data sources from the plurality of streamed data sources to a first transmitter from the plurality of transmitters.

Clause 11. The system of clause 10, wherein the set of instructions of the memory, when executed, cause the system to:

determine a first amount of data that the first streamed data source will generate;

determine a second amount of data that the second streamed data source will generate; and determine the first allocation of the storage space sizes based on the first and second amounts.

Clause 12. The system of clause 10 or 11, wherein the set of instructions of the memory, when executed, cause the system to:

determine that the first streamed data source is associated with a first transmission priority from the transmission priorities;

determine that the second streamed data source is associated with a second transmission priority from the transmission priorities;

determine based on the first and second transmission priorities, that the first streamed data source is to have data transmitted by the first transmitter before data from the second streamed data source is transmitted by the first transmitter; and determine the first allocation of the storage space sizes based on the first streamed data source having data transmitted by the first transmitter before data from the second streamed data source is transmitted by the first transmitter.

Clause 13. The system of any of clauses 8-12, wherein the set of instructions of the memory, when executed, cause the system to:

generate a second permutation that is a second assignment of the plurality of streamed data sources to the plurality of transmitters for transmission;

generate a second prediction of whether data from the plurality of streamed data sources will need to be stored prior to transmission based on the second permutation, the transmission priorities and the bandwidths of the plurality of transmitters;

generate a second allocation of storage space sizes that the plurality of streamed data sources will need based on the second permutation and the second prediction; and determine whether to retain the first permutation or the second permutation based on the first and second allocations.

Clause 14. The system of any of clauses 8-13, wherein the set of instructions of the memory, when executed, cause the system to:

determine whether to maintain or discard the first permutation based on whether an amount of data of the plurality of streamed data sources is less than an available size of buffers associated with the plurality of transmitters.

Clause 15. A method comprising:

identifying transmission priorities for a plurality of streamed data sources, wherein the transmission priorities indicate a transmission order associated with the plurality of streamed data sources;

generating a first permutation that is a first assignment of the plurality of streamed data sources to a plurality of transmitters for transmission;

generating a first prediction of whether data from the plurality of streamed data sources will need to be stored prior to transmission based on the first permutation, the transmission priorities and bandwidths of the plurality of transmitters; and generating a first allocation of storage space sizes that the plurality of streamed data sources will need based on the first permutation and the first prediction.

Clause 16. The method of clause 15, wherein the plurality of streamed data sources are associated with a vehicle, further wherein the method comprises:

determining whether to maintain or discard the first allocation of the storage space sizes based on whether data generated by the plurality of streamed data sources will be transmitted prior to a completion of an operation by the vehicle.

Clause 17. The method of clause 15, further comprising:

assigning first and second streamed data sources from the plurality of streamed data sources to a first transmitter from the plurality of transmitters.

Clause 18. The method of clause 17, further comprising:

determining a first amount of data that the first streamed data source will generate;

determining a second amount of data that the second streamed data source will generate; and determining the first allocation of storage space sizes based on the first and second amounts.

Clause 19. The method of clauses 17 or 18, further comprising:

determining that the first streamed data source is associated with a first transmission priority from the transmission priorities;

determining that the second streamed data source is associated with a second transmission priority from the transmission priorities;

determining based on the first and second transmission priorities, that the first streamed data source is to have data transmitted by the first transmitter before data from the second streamed data source is transmitted by the first transmitter; and determining the first allocation of the storage space sizes based on the first streamed data source having data transmitted by the first transmitter before data from the second streamed data source is transmitted by the first transmitter.

Clause 20. The method of any of clauses 15-19, further comprising:
generating a second permutation that is a second assignment of the plurality of streamed data sources to the plurality of transmitters for transmission;
generating a second prediction of whether data from the plurality of streamed data sources will need to be stored prior to transmission based on the second permutation, the transmission priorities and the bandwidths of the plurality of transmitters;
generating a second allocation of storage space sizes that the plurality of streamed data sources will need based on the second permutation and the second prediction; and
determining whether to retain the first permutation or the second permutation based on the first and second allocations.

Example sizes/models/values/ranges can have been given, although examples are not limited to the same. Arrangements can be shown in block diagram form in order to avoid obscuring examples, and also in view of the fact that specifics with respect to implementation of such block diagram arrangements are highly dependent upon the computing system within which the example is to be implemented, i.e., such specifics should be well within purview of one skilled in the art. The term "coupled" can be used herein to refer to any type of relationship, direct or indirect, between the components in question, and can apply to electrical, mechanical, fluid, optical, electromagnetic, electromechanical, or other connections. In addition, the terms "first", "second", etc. can be used herein only to facilitate discussion, and carry no particular temporal or chronological significance unless otherwise indicated.

As used in this application and in the claims, a list of items joined by the term "one or more of" can mean any combination of the listed terms. For example, the phrases "one or more of A, B, or C" can mean A; B; C; A and B; A and C; B and C; or A, B, and C.

Those skilled in the art will appreciate from the foregoing description that the broad techniques of the examples can be implemented in a variety of forms. Therefore, while the examples have been described in connection with particular examples thereof, the true scope of the examples should not be so limited since other modifications will become apparent to the skilled practitioner upon a study of the drawings, specification, and following claims.

I claim:

1. At least one computer readable storage medium comprising a set of executable program instructions, which when executed by a computing system, cause the computing system to:
identify transmission priorities for a plurality of streamed data sources, wherein the transmission priorities indicate a transmission order associated with the plurality of streamed data sources;
generate a first permutation that is a first assignment of the plurality of streamed data sources to a plurality of transmitters for transmission;
generate a first prediction of an amount of generated data that will be generated by the plurality of streamed data sources that will need to be stored prior to transmission based on the first permutation, the transmission priorities and bandwidths of the plurality of transmitters;
generate a first allocation of storage space sizes that the plurality of streamed data sources will need based on the first permutation and the first prediction; and
determine whether to maintain or discard the first permutation based on whether the amount of the generated data is less than an available size of buffers associated with the plurality of transmitters.

2. The at least one computer readable storage medium of claim 1, wherein the plurality of streamed data sources are associated with a vehicle, and further wherein the instructions, when executed, cause the computing system to:
determine whether to maintain or discard the first allocation of the storage space sizes based on whether the generated data will be transmitted prior to a completion of an operation by the vehicle.

3. The at least one computer readable storage medium of claim 1, wherein the instructions, when executed, cause the computing system to:
assign first and second streamed data sources from the plurality of streamed data sources to a first transmitter from the plurality of transmitters.

4. The at least one computer readable storage medium of claim 3, wherein the instructions, when executed, cause the computing system to:
determine a first amount of data that the first streamed data source will generate;
determine a second amount of data that the second streamed data source will generate; and
determine the first allocation of the storage space sizes based on the first and second amounts.

5. The at least one computer readable storage medium of claim 4, wherein the instructions, when executed, cause the computing system to:
determine that the first streamed data source is associated with a first transmission priority from the transmission priorities;
determine that the second streamed data source is associated with a second transmission priority from the transmission priorities;
determine based on the first and second transmission priorities, that the first streamed data source is to have data transmitted by the first transmitter before data from the second streamed data source is transmitted by the first transmitter; and
determine the first allocation of the storage space sizes based on the first streamed data source having data transmitted by the first transmitter before data from the second streamed data source is transmitted by the first transmitter.

6. The at least one computer readable storage medium of claim 1, wherein the instructions, when executed, cause the computing system to:
generate a second permutation that is a second assignment of the plurality of streamed data sources to the plurality of transmitters for transmission;
generate a second prediction of an amount of generated data that will be generated by the plurality of streamed data sources that will need to be stored prior to transmission based on the second permutation, the transmission priorities and the bandwidths of the plurality of transmitters;
generate a second allocation of storage space sizes that the plurality of streamed data sources will need based on the second permutation and the second prediction;
and determine whether to retain the first permutation or the second permutation based on the storage spaces of the first allocation and the storage spaces of second allocations.

7. The at least one computer readable storage medium of claim 6, wherein the instructions, when executed, cause the computing system to:
- retain the first allocation and discard the second allocation when the storage space sizes of the first allocation are less than the storage space sizes of the second allocation; and
- retain the second allocation and discard the first allocation when the storage space sizes of the second allocation are less than the storage space sizes of the first allocation.

8. A system comprising:
- a processor; and
- a memory having a set of instructions, which when executed by the processor, cause the system to:
- identify transmission priorities for a plurality of streamed data sources, wherein the transmission priorities indicate a transmission order associated with the plurality of streamed data sources;
- generate a first permutation that is a first assignment of the plurality of streamed data sources to a plurality of transmitters for transmission;
- generate a first prediction of an amount of generated data that will be generated by the plurality of streamed data sources that will need to be stored prior to transmission based on first permutation, the transmission priorities and bandwidths of the plurality of transmitters;
- generate a first allocation of storage space sizes that the plurality of streamed data sources will need based on the first permutation and the first prediction; and
- determine whether to maintain or discard the first permutation based on whether the amount of the generated data is less than an available size of buffers associated with the plurality of transmitters.

9. The system of claim 8, wherein the plurality of streamed data sources are associated with a vehicle, further wherein the set of instructions of the memory, when executed, cause the system to:
- determine whether to maintain or discard the first allocation of the storage space sizes based on whether the generated data will be transmitted prior to a completion of an operation by the vehicle.

10. The system of claim 8, wherein the set of instructions of the memory, when executed, cause the system to:
- assign first and second streamed data sources from the plurality of streamed data sources to a first transmitter from the plurality of transmitters.

11. The system of claim 10, wherein the set of instructions of the memory, when executed, cause the system to:
- determine a first amount of data that the first streamed data source will generate;
- determine a second amount of data that the second streamed data source will generate; and
- determine the first allocation of the storage space sizes based on the first and second amounts.

12. The system of claim 11, wherein the set of instructions of the memory, when executed, cause the system to:
- determine that the first streamed data source is associated with a first transmission priority from the transmission priorities;
- determine that the second streamed data source is associated with a second transmission priority from the transmission priorities;
- determine based on the first and second transmission priorities, that the first streamed data source is to have data transmitted by the first transmitter before data from the second streamed data source is transmitted by the first transmitter; and
- determine the first allocation of the storage space sizes based on the first streamed data source having data transmitted by the first transmitter before data from the second streamed data source is transmitted by the first transmitter.

13. The system of claim 8, wherein the set of instructions of the memory, when executed, cause the system to:
- generate a second permutation that is a second assignment of the plurality of streamed data sources to the plurality of transmitters for transmission;
- generate a second prediction of an amount of generated data that will be generated by the plurality of streamed data sources that will need to be stored prior to transmission based on the second permutation, the transmission priorities and the bandwidths of the plurality of transmitters;
- generate a second allocation of storage space sizes that the plurality of streamed data sources will need based on the second permutation and the second prediction; and
- determine whether to retain the first permutation or the second permutation based on the storage spaces of the first allocation and the storage spaces of second allocations.

14. The system of claim 13, wherein the set of instructions of the memory, when executed, cause the system to:
- retain the first allocation and discard the second allocation when the storage space sizes of the first allocation are less than the storage space sizes of the second allocation; and
- retain the second allocation and discard the first allocation when the storage space sizes of the second allocation are less than the storage space sizes of the first allocation.

15. A method comprising:
- identifying transmission priorities for a plurality of streamed data sources, wherein the transmission priorities indicate a transmission order associated with the plurality of streamed data sources;
- generating a first permutation that is a first assignment of the plurality of streamed data sources to a plurality of transmitters for transmission;
- generating a first prediction of an amount of generated data that will be generated by the plurality of streamed data sources that will need to be stored prior to transmission based on the first permutation, the transmission priorities and bandwidths of the plurality of transmitters;
- generating a first allocation of storage space sizes that the plurality of streamed data sources will need based on the first permutation and the first prediction; and
- determining whether to maintain or discard the first permutation based on whether the amount of the generated data is less than an available size of buffers associated with the plurality of transmitters.

16. The method of claim 15, wherein the plurality of streamed data sources are associated with a vehicle, further wherein the method comprises:
- determining whether to maintain or discard the first allocation of the storage space sizes based on whether the generated data will be transmitted prior to a completion of an operation by the vehicle.

17. The method of claim 15, further comprising:
assigning first and second streamed data sources from the plurality of streamed data sources to a first transmitter from the plurality of transmitters.

18. The method of claim 17, further comprising:
determining a first amount of data that the first streamed data source will generate;
determining a second amount of data that the second streamed data source will generate; and
determining the first allocation of the storage space sizes based on the first and second amounts.

19. The method of claim 18, further comprising:
determining that the first streamed data source is associated with a first transmission priority from the transmission priorities;
determining that the second streamed data source is associated with a second transmission priority from the transmission priorities;
determining based on the first and second transmission priorities, that the first streamed data source is to have data transmitted by the first transmitter before data from the second streamed data source is transmitted by the first transmitter; and
determining the first allocation of the storage space sizes based on the first streamed data source having data transmitted by the first transmitter before data from the second streamed data source is transmitted by the first transmitter.

20. The method of claim 15, further comprising:
generating a second permutation that is a second assignment of the plurality of streamed data sources to the plurality of transmitters for transmission;
generate a second prediction of an amount of generated data that will be generated by the plurality of streamed data sources that will need to be stored prior to transmission based on the second permutation, the transmission priorities and the bandwidths of the plurality of transmitters;
generate a second allocation of storage space sizes that the plurality of streamed data sources will need based on the second permutation and the second prediction;
and determine whether to retain the first permutation or the second permutation based on the storage spaces of the first allocation and the storage spaces of second allocations.

* * * * *